Figure 1:
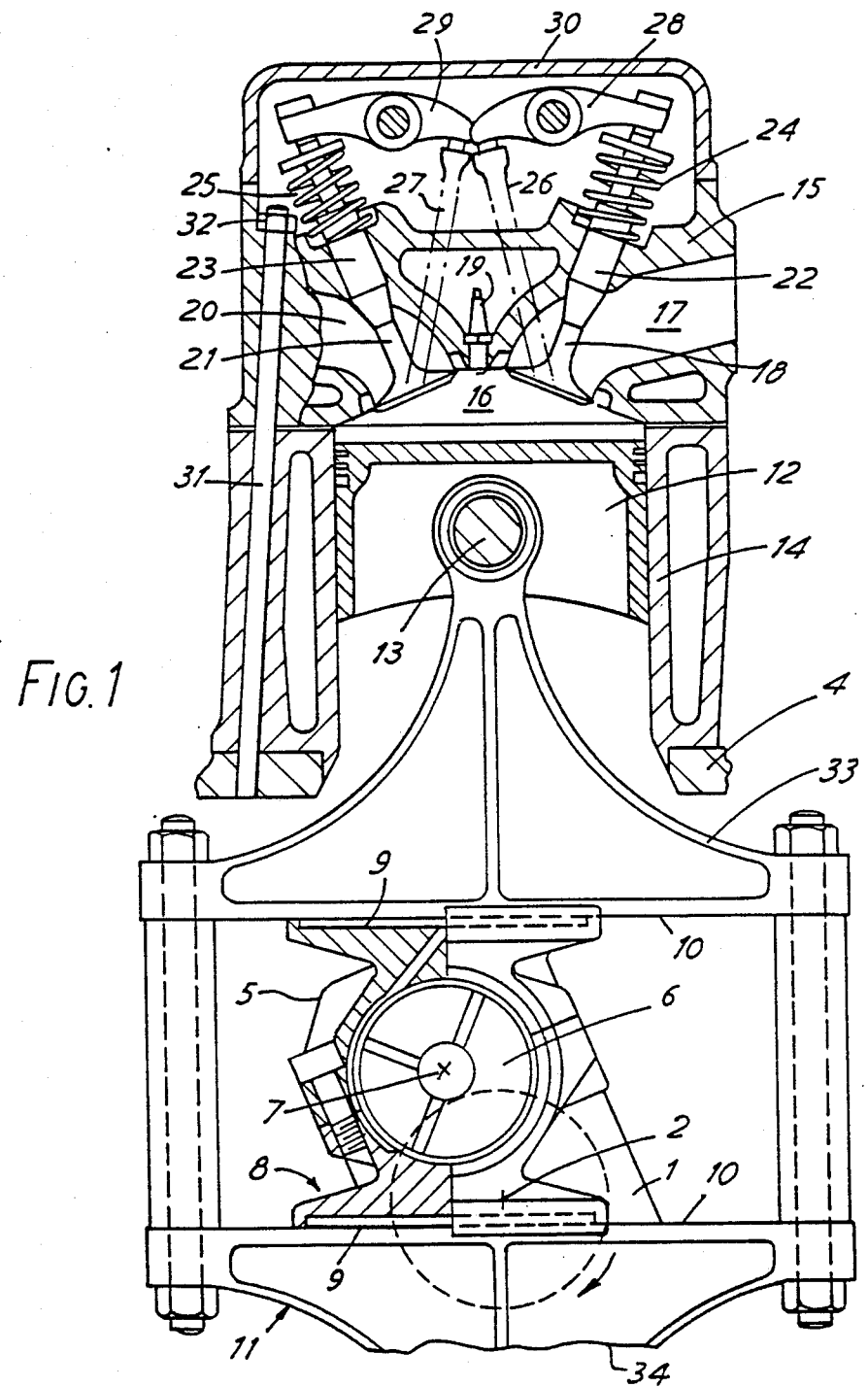

United States Patent [19]
Neale, Michael J. et al.

[11] Patent Number: 4,884,536
[45] Date of Patent: Dec. 5, 1989

[54] INTERCONNECTING ROTARY AND RECIPROCATORY MOTION

[75] Inventors: Neale, Michael J., Hampshire; Polak, Thomas A., Farnham, both of United Kingdom

[73] Assignee: Collins Motor Corporation Limited, West Perth, Australia

[21] Appl. No.: 305,731
[22] PCT Filed: May 27, 1988
[86] PCT No.: PCT/GB88/00419
§ 371 Date: Jan. 26, 1989
§ 102(e) Date: Jan. 26, 1989
[87] PCT Pub. No.: WO88/09427
PCT Pub. Date: Dec. 1, 1988

[30] Foreign Application Priority Data
May 29, 1987 [GB] United Kingdom ............... 8712645

[51] Int. Cl.⁴ ........................................... F02B 75/32
[52] U.S. Cl. ........................................... 123/197 AC
[58] Field of Search .................. 123/197 AB, 197 AC, 123/56 AC, 56 BC

[56] References Cited
U.S. PATENT DOCUMENTS
2,290,202 7/1942 Nelson ........................... 123/56 BC
4,013,048 3/1977 Reitz ............................... 123/56 BC
4,466,403 8/1984 Menton ......................... 123/197 AC
4,512,290 4/1985 Ficht et al. .................... 123/197 AC
4,512,291 4/1985 Kirk .............................. 123/197 AC
4,598,672 7/1986 Jayne et al. ................... 123/197 AC
4,776,310 10/1988 Gray ............................. 123/197 AC
4,791,898 12/1988 Jayne ............................ 123/197 AC FOREIGN PATENT DOCUMENTS
3433510 3/1986 Fed. Rep. of Germany.
2167805 6/1986 United Kingdom.

Primary Examiner—David A. Okonsky
Attorney, Agent, or Firm—Flynn, Thiel, Boutell & Tanis

[57] ABSTRACT

A reciprocatory assembly presents two parallel opposed guide surfaces, transverse to its direction of reciprocation, on elements interconnected at their two ends by tie rods and spacers. A drive block carries bearing plates slidadably engaged with the guide surfaces. Oil is fed to the bearing plates from a passage in a crankpin journalled in the drive block through passages in the crankpin to grooves and passages in the drive block and plates. To ensure maintenance of an adequate lubricant film over the whole length of the bearing plates when under load, end portions of the drive block are made slightly flexible elastically in bending to be able to conform to slight deformations of the elements under load.

8 Claims, 3 Drawing Sheets

INTERCONNECTING ROTARY AND RECIPROCATORY MOTION

The present invention relates to an apparatus for converting rotary motion to reciprocatory motion and vice versa.

One well-known form of such apparatus is known as the Crank and Slotted Cross-head or 'Scotch Yoke' mechanism. A rotary member mounted for rotation about an axis carries a drive block rotatably mounted on an eccentric portion of the rotary member. The drive block is slidable in a transverse guide or slot in a reciprocatory member.

An object of the invention is to provide apparatus capable of operating at high speeds and under high loads, for example in connecting pistons to crankshafts in internal combustion engines.

According to the invention there is provided apparatus for converting rotary motion to reciprocatory linear motion and vice versa, comprising:

a rotary member mounted for rotation about a first axis, a reciprocatory member guided for reciprocatory motion in a reciprocation direction transverse to the first axis, a drive block rotatably mounted on an eccentric portion of the rotary member, the drive block having a slide surface slidably engaged with a guide surface carried by the reciprocatory member extending transversely to the reciprocation direction, and means for supplying liquid lubricant to the slide surface, wherein portions of the drive block supporting the portions of the slide surface are sufficiently elastically flexible in bending to follow deflections of the guide surface so as to maintain a load-bearing film of lubricant between the slide surface and the guide surface along substantially the whole length of the slide surface when under load. Conveniently, the end portions of the slide surface are more yielding than the central portions. Preferably, the stiffness of the end portions reduces progressively towards their outer ends.

Usually, the drive block will have two parallel slide surfaces facing in opposite directions each slidably engaged with a corresponding guide surface.

Advantageously, the slide surfaces of the drive block are shorter than the cooperating guide surfaces and are formed of a softer material than that forming the cooperating slide surfaces but of sufficient fatigue strength to withstand the cyclic loadings imposed thereon.

Advantageously, each slide surface of the drive block is formed on a plate of bearing material housed in a recess in the drive block and the lubricant supply means is arranged to supply lubricant to both faces of the plate. This form of construction both avoids the problem of fixing a body of expensive bearing material to the drive block (or depositing it thereon, which is not always possible for some desirable materials) and also provides an additional lubricant film clearance which is charged with lubricant from the supply during the part of a revolution of the rotary member during which the pad is not loaded.

Figure 2:
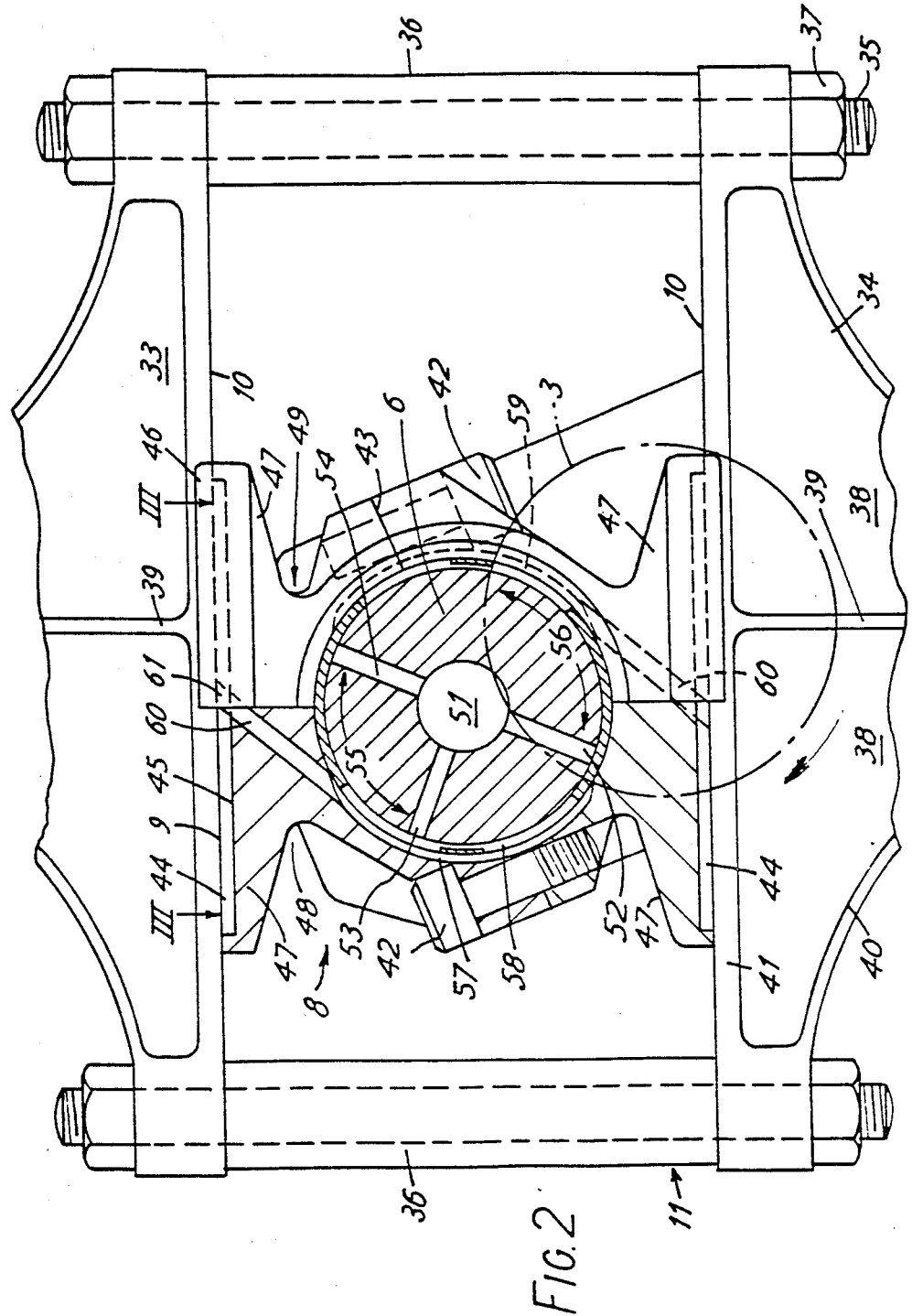
Figure 3:
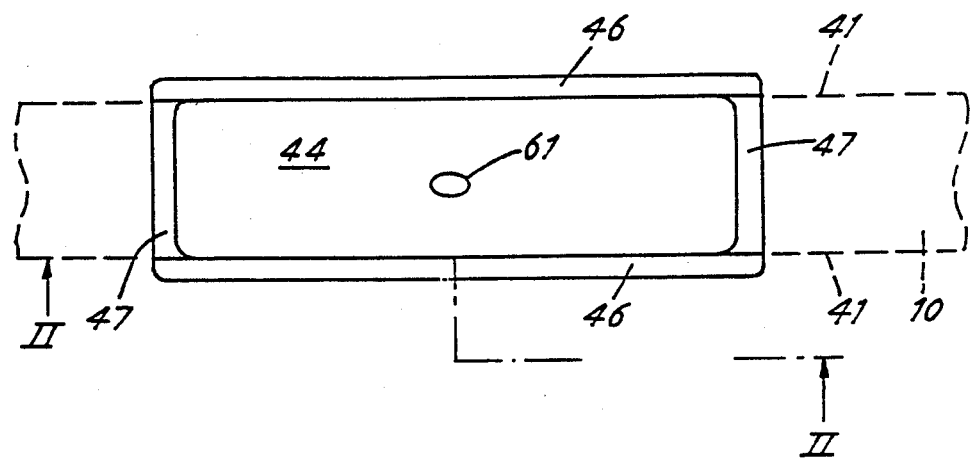

An embodiment of the invention will now be described by way of example with reference to the accompanying drawings in which:

FIG. 1 is a driving connection between a crankshaft and a piston of an internal combustion engine, FIG. 2 shows part of FIG. 1 on an enlarged scale, and FIG. 3 is a plan view on the line 3—3 of FIG. 2.

The internal combustion engine of which portions are shown in FIGS. 1 and 2 comprises a crankshaft 1 mounted for rotation (clockwise in FIGS. 1 and 2) in the normal manner about its axis 2 in appropriate journal bearings indicated at 3 in a crank case 4. The crankshaft 1 includes a pair of spaced webs 5 interconnected by a crank pin 6 the axis 7 of which is displaced from the axis 2 of the crankshaft by the 'throw' distance of the crankshaft.

Journalled on the crank pin 6 is a drive block 8 having opposed parallel sliding surfaces 9 which cooperate with guide surfaces 10 on a reciprocatory yoke assembly 11.

A piston 12 is attached to one end of the assembly 11 by means of a conventional gudgeon pin 13 and slides in a cylinder 14, thereby guiding the one end of the assembly 11 for linear movement. In the case of an opposed-piston engine, the other end of the assembly 11 may be similarly guided by a further piston (not shown). Alternatively, that end of the yoke assembly 11 may be guided by a simple linear guide such as a guide rod engaged in a stationary guide sleeve.

The outer end of the cylinder 14 is closed, in the usual manner, by a cylinder head 15 defining a combustion chamber 16 into which a fuel-air mixture may be drawn by the piston 12 during an induction stroke through an inlet passage 17 controlled by an inlet valve 18. After compression into the combustion chamber 16, the mixture can be fired by a spark plug 19. Exhaust gases leave through an exhaust passage 20 controlled by an exhaust valve member 21. The valve members 18 and 21 are slidable in valve guides 22 and 23 in the cylinder head 15, are urged to their closed positions by valve springs 24 and 25 and are opened at appropriate points in the operating cycle by a camshaft (not shown) driven at half crankshaft speed and operating the valves by way of push rods 26 and 27 and rockers 28 and 29 within a rocker chamber closed by a rocker cover 30.

The cylinder block 14 and cylinder head 15 are secured to the crankcase 4 by a set of studs 31 screwed at one end into the crank case 4 and carrying a nut 32 at the other end.

As can be seen more clearly from FIGS. 2 and 3, the connecting yoke assembly 11 consists of two connecting links 33 and 34 which are secured together by tie rods 35 extending through the ends of the links 33 and 34 and through tubular spacers 36, the ends of the tie rods 35 being screw-threaded to carry nuts 37. The tubular spacers bear against extensions of the guide surfaces 10. The connecting links 33 and 34 are of substantial stiffness against deformation in the plane of the drawings of FIGS. 1 and 2. The central portions of the connecting links are in particular of very deep web section at 38 and have central ribs 39 as well as edge flanges 40 and 41, the flanges 41 defining the majority of the guide surfaces 10.

The drive block 8 is formed in two halves to enable it to be assembled onto the crank pin 6. The two halves are identical and are secured together by socket-headed screws 42. The dividing plane 43 at which the two halves of the drive block meet is inclined to the planes of the sliding surfaces 9 to enable the screws 42 to be of adequate length and yet be easily insertible.

Each sliding surface 9 is formed by an insert plate 44 of plain bearing material of high compressive strength but of a material which is softer than the steel guide surfaces 10. At their guide surfaces 10, the connecting links are surface hardened, for example by nitriding, without interfering with the elastic qualities of the connecting links. The plates 44 may for example be of lead-bronze or of other suitable material of the kind used for plain journal bearings.

Each bearing plate 44 is housed in a recess 45 formed in the respective sliding face of the drive block.

Guide flanges 46 extend along each side of each recess 45 for the whole length of the drive block and are a close sliding fit against guide faces formed by the edge surfaces of the flanges 41.

The end portions 47 of the parts of the drive block 8 formed with the recesses 45 are of decreasing thickness towards their outer ends, being defined by undercuts or reentrants 48 and 49. As a result, these projecting portions 47 are slightly resiliently yielding when subjecting to high loads.

At high engine speeds, the drive block 8 has to impose high accelerations on the connecting link assembly 11 towards each end of the stroke of the latter. Specifically, each bearing plate 44 has to decelerate the entire connecting yoke 11 (and the connected piston or pistons) and then accelerate this assembly in the opposite direction. The forces required to achieve this are transmitted by the drive block through the bearing plate 44 to the central regions of the cooperating guide surface 10. Despite the great stiffness of the connecting links 33 and 34, particularly in their central regions, it is inevitable that there will be a very slight elastic deformation of the connecting link 33 or 34 which is beng subjected to the high loading, bearing in mind that this loading is applied not only by the bearing plate 44 in the central region but also by the tie rods 35 acting at the two ends of the connecting link in question since the forces required to effect the required accelerations of the other connecting link are transmitted through these tie rods.

The slight elastic yielding, in bending, in the plane of FIGS. 1 and 2 by the outer portions 47 of the drive block enables these portions of the drive block to conform under hydrodynamic, load-carrying oil film pressures to the slight deformation of the connecting link and thus avoid the risk of local loss of oil film through which the load forces are transmitted.

To ensure the presence of this oil film, oil is supplied in the normal manner under pressure from an oil pump (not shown) through the main journal bearing 3 of the crankshaft into internal passages of the crankshaft, including a drilling extending through the crankshaft web 5 into an internal distribution space 51 in the crank pin 6. Three radial passages 52, 53 and 54 deliver oil from the chamber 51 to the surface of the crank pin. The passages 52 and 54 are diametrically opposed while the passage 53 is at right-angles to passages 52 and 54. All three passages 52,53 and 54 are at angles of about 45 degrees to the common plane of the axes 2 and 7. The surface of the crank pin is free of any drillings or grooves over a 90° sector 55 extending between the passages 53 and 54 and also over a diametrically opposite 90° sector 56.

The crank pin 6 runs in a conventional thin wall bearing 57 which is an interference fit in the drive block and is angularly located by one or more lugs in the normal manner. The lateral portions of the bearing 57 are formed with slots 58 to permit oil to pass from the passages 52, 53 or 54 into grooves 59 formed in the bore in the drive block and connected by passages 60 opening into the recesses 45. Each bearing plate 44 is formed with a central hole 61 registering with the respective passage 60.

In the positions of greatest acceleration, the portions 55 and 56 of the crank pin are in register with solid, unperforated parts of the bearing 57. In this way, under peak loads, high hydrodynamic pressures can be built up in the oil film.

The radial passage 52 supplies oil to both the crank pin bearing and the connected bearing plate just before the imposition of high inertia loads. The radial passage 53 supplies oil to the passageway 60 and thus to the bearing plate 44 just before the latter is subjected to the gas loads resulting from ignition of a charge of mixture in the combustion chamber 16. The passageway 54 performs a similar function in supplying oil, when in the position shown in FIGS. 1 and 2, to the part of the crank pin bearing 57 just before the latter is subjected to the gas load when in register with the sector 55.

The bearing plate 44 is held captive in its recess but with sufficient clearance movement in the longitudinal direction of the yoke 11 such that when not loaded by inertial or gas loads from the yoke in those parts of the operating cycle where the inertia loads on the yoke assembly cause an opening up of the clearance between the bearing plate 44 and the guide surface 10, corresponding inertia effects will act upon the plate 44 and cause it to move partially out of its recess 45 and thus reduce any clearance which would otherwise open up between the plate 44 and the guide 10 due to deflections of the yoke assembly and the drive block. This movement of the plate 44, in conjunction with appropriate sizing of the passages 60 and holes 61, will prevent any excess oil loss from the assembly which might otherwise occur under conditions of high inertia loading. At the same time a supply of oil will build up behind the plate 44 and within its recess 45 and under subsequent high load this oil can be transferred through the central hole 61 to the sliding face between the bearing plate 44 and the guide surface 10.

Apparatus according to the invention is particularly suitable for use in a three-cylinder four stroke internal combustion engine of the kind described in our European Patent Application No. 87302948.2. Such an engine would have two yoke assemblies, having their directions of reciprocation perpendicular to each other and preferably two drive blocks, one for each yoke assembly, on the same crankpin, although the two drive blocks may be combined into one block. One yoke assembly would reciprocate horizontally with the pistons of a pair of horizontally opposed cylinders attached to the ends of the yoke assembly. The other yoke assembly would then reciprocate vertically with the piston of the third cylinder attached to its upper end and a counterbalance mass, corresponding to the mass of a piston, attached to its lower end.

Similarly, a four cylinder two-stroke engine may be constructed in the same manner but with its fourth piston in the place of the countermass. The mutually perpendicular reciprocation directions of the two yoke assemblies may be at 45° to the horizontal or may be both horizontal (with the engine axis vertical).

We claim:

1. Apparatus for converting rotary motion to reciprocatory linear motion and vice versa, comprising:
   a rotary member mounted for rotation about a first axis, a reciprocatory member guided for reciprocatory motion in a reciprocation direction transverse to the first axis, a drive block rotatably mounted on an eccentric portion of the rotary member, the drive block having a slide surface slidably engaged with a guide surface carried by the reciprocatory member extending transversely to the reciprocation direction, and means for supplying liquid lubricant to the slide surface, wherein portions of the drive block supporting the portions of the slide surface are sufficiently elastically flexible in bending to follow deflections of the guide surface so as to maintain a load-bearing film of lubricant between the slide surface and the guide surface along substantially the whole length of the slide surface when under load.

2. Apparatus according to claim 1, wherein the end portions of the slide surface are more yielding than the central portions.

3. Apparatus according to claim 2, wherein the stiffness of the end portions reduces progressively towards their outer ends.

4. Apparatus according to claim 1, wherein the slide surfaces of the drive block are shorter than the cooperating guide surfaces and are formed of a softer material than that forming the cooperating guide surfaces but of sufficient fatigue strength to withstand the cyclic loadings imposed thereon.

5. Apparatus according to claim 1, wherein each slide surface of the drive block is formed on a plate of bearing material housed in a recess in the drive block and the lubricant supply means is arranged to supply lubricant to both faces of the plate.

6. Apparatus according to claim 1, wherein the drive block has two parallel said slide surfaces facing in opposite directions, each slidably engaged with a correspoding said guide surface.

7. Apparatus according to claim 5, wherein each said plate is freely retained in its recess for movement in the direction of right angles to its slide surface but is constrained against movement relative to the drive block in other directions.

8. A reciprocatory internal combustion engine having a shaft and at least one piston slidable in a cylinder, wherein the piston is connected to the shaft by apparatus according to claim 1.

* * * * *